United States Patent
Evans et al.

(10) Patent No.: US 10,062,367 B1
(45) Date of Patent: Aug. 28, 2018

(54) VOCAL EFFECTS CONTROL SYSTEM

(71) Applicant: MUSIC TRIBE GLOBAL BRANDS LTD., Tortola (VG)

(72) Inventors: Stephen Jarrett Evans, Victoria (CA); Jesper Richard Rage, Victoria (CA)

(73) Assignee: MUSIC TRIBE GLOBAL BRANDS LTD., Tortola (VG)

( * ) Notice: Subject to any disclaimer, the term of this patent is extended or adjusted under 35 U.S.C. 154(b) by 0 days.

(21) Appl. No.: 15/650,589

(22) Filed: Jul. 14, 2017

(51) Int. Cl.
*G10H 1/36* (2006.01)
*G06F 3/0482* (2013.01)
*G10H 1/00* (2006.01)
*G10H 1/02* (2006.01)
*G10H 1/06* (2006.01)

(52) U.S. Cl.
CPC ........... *G10H 1/366* (2013.01); *G06F 3/0482* (2013.01); *G10H 1/0041* (2013.01); *G10H 1/0091* (2013.01); *G10H 1/02* (2013.01); *G10H 1/06* (2013.01)

(58) Field of Classification Search
CPC ........... H04N 21/47205; H04N 21/431; H04N 21/8547; G10H 1/361; G10H 2210/021; G10H 2240/325; G10H 2220/101; G10H 2220/145; G10H 2210/155
See application file for complete search history.

(56) References Cited

U.S. PATENT DOCUMENTS

| | | | | |
|---|---|---|---|---|
| 5,684,918 A | * | 11/1997 | Abecassis | A63F 13/10 348/14.01 |
| 2010/0204811 A1 | * | 8/2010 | Transeau | G11B 27/034 700/94 |
| 2010/0241953 A1 | * | 9/2010 | Kim | H04N 21/85406 715/256 |
| 2013/0205243 A1 | * | 8/2013 | Rivera | G06F 3/04817 715/776 |
| 2014/0046667 A1 | * | 2/2014 | Yeom | G10L 13/033 704/258 |
| 2015/0348532 A1 | * | 12/2015 | Cameron | G06F 17/30029 704/260 |
| 2016/0012853 A1 | * | 1/2016 | Cabanilla | G11B 27/031 386/241 |
| 2016/0057316 A1 | * | 2/2016 | Godfrey | H04N 5/04 348/515 |
| 2016/0078879 A1 | * | 3/2016 | Lu | G10L 25/81 381/56 |
| 2016/0358595 A1 | * | 12/2016 | Sung | G10H 1/368 |
| 2016/0372096 A1 | * | 12/2016 | Lyske | G10H 1/40 |
| 2017/0047082 A1 | * | 2/2017 | Lee | G10H 1/0008 |
| 2017/0123755 A1 | * | 5/2017 | Hersh | G06F 3/165 |
| 2017/0124999 A1 | * | 5/2017 | Hersh | G10H 1/368 |
| 2017/0140745 A1 | * | 5/2017 | Nayak | G10H 1/366 |
| 2017/0188106 A1 | * | 6/2017 | Harb | H04N 21/4755 |

* cited by examiner

*Primary Examiner* — Marlon Fletcher
(74) *Attorney, Agent, or Firm* — Seed IP Law Group LLP

(57) ABSTRACT

A vocal effects control system may include a device having a display, an audio input, an audio output, and a processor configured to present a user interface (UI) on the display. The UI may include an array of toggle elements, each toggle element corresponding to one of a plurality of vocal effects applicable by the processor, and one or more scrolling vocal effect indicators synchronized to a selected audio background track of a song, each of the one or more vocal effect indicators indicating when a corresponding one of the vocal effects is to be active within a timeline of the song.

18 Claims, 9 Drawing Sheets

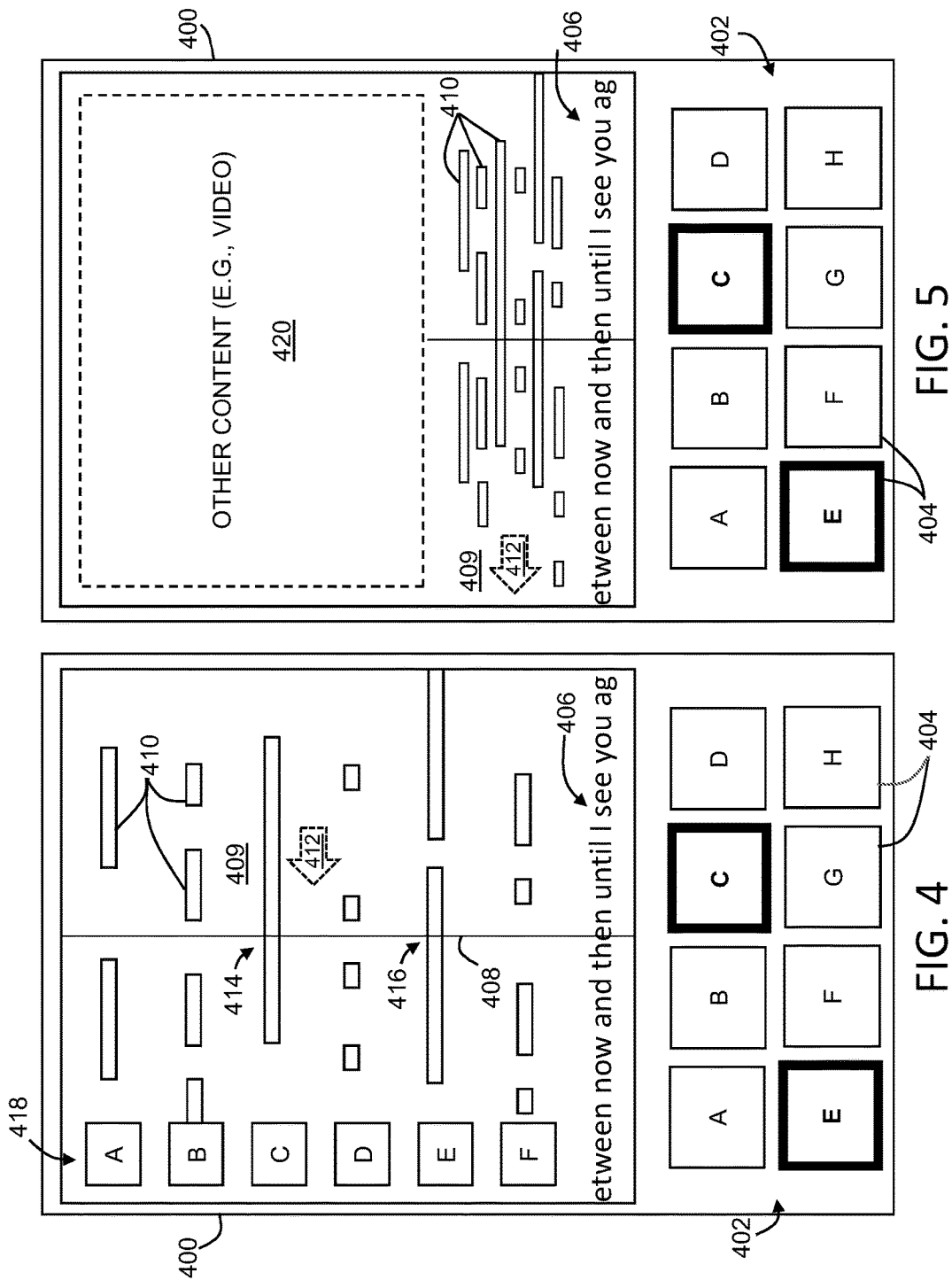

VOCAL EFFECTS CONTROL SYSTEM

INTRODUCTION

Singers, and more generally musicians of all types, often wish to modify the natural sound of a voice and/or instrument to create a different resulting sound. Many such musical modification effects are known, such as reverberation ("reverb"), delay, voice doubling, tone shifting, and harmony generation, among others.

As an example, harmony generation involves generating musically correct harmony notes to complement one or more notes produced by a singer and/or accompaniment instruments. Examples of harmony generation techniques are described, for example, in U.S. Pat. No. 7,667,126 to Shi and U.S. Pat. No. 8,168,877 to Rutledge et al., each of which are hereby incorporated by reference. The techniques disclosed in these references generally involve transmitting amplified musical signals, including one or both of a melody signal and an accompaniment signal, to a signal processor (which may be hardware- and/or software-based) through signal jacks, analyzing the signals to determine musically correct harmony notes, and then producing the harmony notes and combining them with the original musical signals.

There are numerous vocal and instrument effects available, and these generally fall under categories such as reverb, delay, pitch correction, chorus, flanger, distortion, live vocal harmony, and others. Such effects are used in professional recording studios, karaoke apps, and karaoke devices. Due to the complexity of vocal effects and processing limitations of non-professional systems, enthusiasts such as novice singers, karaoke singers and non-musicians are typically limited to a use of a single effect or a single group of effects with every song, with little to no control over any of the effects' parameters. This level of complexity and control is not reflective of commercially-produced original songs. The end result is a low-quality rendition of a song that does not sound authentic to the original. This disparity becomes even more apparent as more complex effects, effects combinations, and effects parameters are used in the original song production.

SUMMARY

The present disclosure provides systems, apparatuses, and methods relating to applications and user interfaces for easily applying and controlling vocal effects to produce a song. In some embodiments, a vocal effects control system may include: a display; a microphone; a speaker; a non-transitory computer-readable memory storing media files relating to a plurality of songs available for playback on the system; a processor in communication with the display, the microphone, the speaker, and the memory; and a plurality of instructions executable by the processor to: present a user interface (UI) on the display; play, on the speaker, an audio background track of a selected one of the songs, while simultaneously presenting, via the UI, a selected vocal effects sequence comprising timeline information related to a plurality of vocal effects; receive vocal input from the microphone; apply the vocal effects to the vocal input according to the selected vocal effects sequence; and adjust application of the vocal effects in response to inputs to the UI; wherein the UI includes: an array of toggle elements, each toggle element corresponding to one of the plurality of vocal effects; one or more scrolling vocal effect indicators synchronized to the selected audio background track, each of the one or more vocal effect indicators indicating when a corresponding one of the vocal effects is active within a timeline of the song; and a timeline indicator element configured to indicate, relative to the one or more scrolling vocal effect indicators, a current temporal position within the song; wherein the processor is configured to respond to an input to the UI that toggles one of the toggle elements at a selected temporal position within the song by toggling activation of the corresponding vocal effect and the corresponding scrolling vocal effect indicator at the selected temporal position.

In some embodiments, a computer-implemented method may include: presenting a graphical user interface (GUI) on a display of an electronic device comprising a speaker output, a microphone input, and a processor configured to execute digital signal processing (DSP) algorithms; simultaneously playing, via the speaker output, an audio background track of a selected song, and presenting, via the UI, a selected vocal effects sequence comprising time-based information related to a plurality of vocal effects; receiving vocal input via the microphone input; applying the vocal effects to the vocal input using the DSP algorithms according to the selected vocal effects sequence; and automatically adjusting application of the vocal effects in response to inputs to the GUI; wherein the GUI includes: an array of toggle elements, each toggle element corresponding to one of the plurality of vocal effects; one or more scrolling vocal effect indicators synchronized to the selected audio background track, each of the one or more vocal effect indicators indicating when a corresponding one of the vocal effects is active within a timeline of the song; and a timeline indicator element configured to indicate, relative to the one or more scrolling vocal effect indicators, the current temporal position within the song.

In some embodiments, a vocal effects controller may include: an electronic device including a processor, an audio input, an audio output, and a display, the processor configured to present a graphical user interface (GUI) on the display; wherein the GUI includes: an array of toggle elements, each toggle element corresponding to one of a plurality of vocal effects applicable by the processor; one or more scrolling vocal effect indicators synchronized to a selected audio background track of a song, each of the one or more vocal effect indicators indicating when a corresponding one of the vocal effects is to be active within a timeline of the song; and a timeline indicator element configured to indicate, relative to the one or more scrolling vocal effect indicators, the current temporal position within the song; wherein the processor is configured to respond to an input to the GUI that toggles one of the toggle elements at a selected temporal position within the song by toggling activation of the corresponding vocal effect and the corresponding scrolling vocal effect indicator at the selected temporal position.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 depicts a first illustrative user interface in an expanded configuration.

FIG. 5 depicts the first illustrative user interface in a collapsed configuration.

DESCRIPTION

Figure 1:
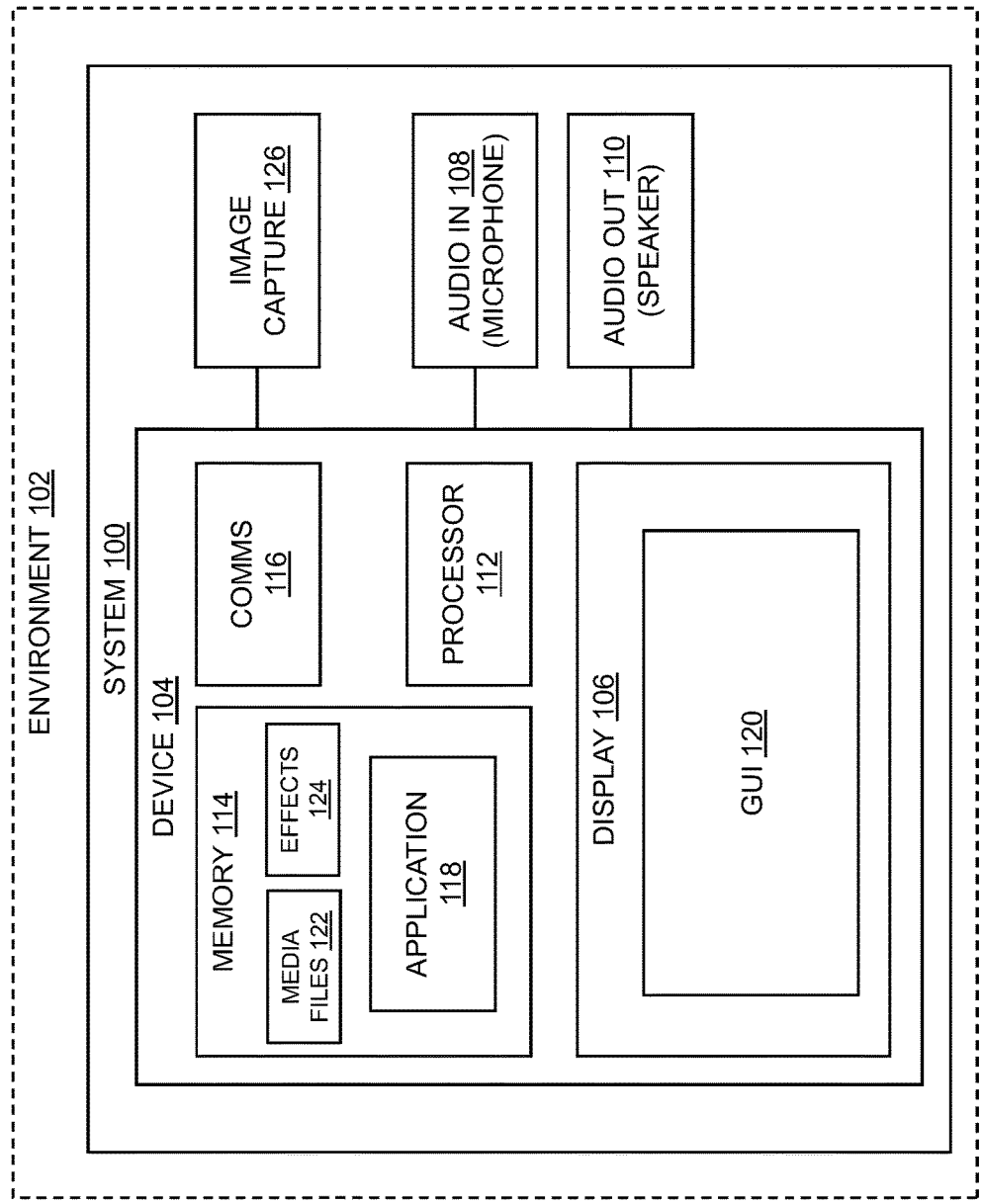
FIG. 1 is a schematic diagram of an illustrative vocal effects control system in accordance with the present teachings.

Various aspects and examples of an interactive vocal effects control system, as well as related devices and methods, are described below and illustrated in the associated drawings. Unless otherwise specified, a vocal effects control system in accordance with the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Directional terms such as "up," "down," "vertical," "horizontal," and the like should be understood in the context of a host device on which systems and methods described herein may be installed, executed, and/or displayed.

"Coupled" means connected, either permanently or releasably, whether directly or indirectly through intervening components, and is not necessarily limited to physical connection(s). For example, two electronic components may be coupled electrically or electronically through intermediate or intervening components, or may be coupled wirelessly.

Overview

Original, commercially-produced songs require skilled experts, including highly-sought-after teams of professional producers and engineers, applying unique methodologies and techniques to produce a signature sound. In the recording studio, raw vocal tracks are typically recorded first and then effects are applied in post-production, utilizing professional recording software and third-party effects plug-ins. This post-production process entails a number of steps, including the artful selection of each individual effect from a suite of numerous commercially available effects, combining them and dialing in the various parameters and sub-parameters inherent in each effect.

Within the production software ecosystem, these effects, combinations, and parameters are applied with professional recording software. The recording software allows for complex and dynamic effects changes over the course of the song. For example, an effect or group of effects may turn on and off during certain sections of a song, or the volume levels for specific effects such as a harmony may become louder during bridge and chorus sections. The process may end with a "mix-down" into a single stereo track, which is then mastered and used to render a final audio file for commercial distribution.

In the typical production process, the resulting audio file does not retain any of the recording session data (e.g., type of effects, effects combinations, parameter settings and automation). It would be very difficult for a novice singer or musician to decode and replicate the effects timeline automation by simply listening to the final audio file. Depending on complexity, even other skilled studio engineers can only guess and approximate the effects that were applied. Many producers consider these techniques to be trade secrets, and do not disclose studio session techniques and information to the public.

For non-musicians and karaoke singers, there is currently no easy-to-use system available for live performance that can automatically recreate authentic vocal effects production techniques used in an original song. Furthermore, to ensure authenticity, the singer would need extensive knowledge of audio effects and the different recording studio production techniques used for each original song. The vocal production and effects used in a song are typically designed for an original recording artist's voice. Applying the same studio-created effects to other singers, each with different vocal capabilities, such as: off-pitch singers, singers with weak vocal tone and/or range, and other unique characteristics would require additional effects such as live pitch correction, harmony generation and harmony pitch correction as well as other effect parameter adjustments. Accordingly, a novice singer would still have less than adequate results even using the effects applied to the original song as authored in a professional recording studio.

The present disclosure relates to new methods of creating, editing, displaying, sharing, and purchasing multi-layered vocal effects and vocal effects sequences for live or recorded lead vocal(s). The vocal effects may be synchronized to a visual vocal effects timeline (VET) associated (e.g., synchronized) with the timeline of a selected karaoke song or musical background track. In some examples, the visual timeline of the vocal effects sequence is presented on the graphical user interface (GUI) of an electronic device, such as a touch screen-based vocal processing device for use in a karaoke system. Creating and editing of the vocal effects processing sequences can be performed at various times, e.g., live (while the person is singing) or after the person has recorded a lead vocal track. Saving, sharing, and/or purchasing a created vocal effects timeline (also referred to as a vocal effects automation timeline and/or vocal effects sequence) may be facilitated based on user data and skill levels.

In general, a vocal effects control system, or controller, may include a user interface (UI) presented on the display of an electronic device for interactively applying and modifying vocal effects by a user, either in real time or after recording a vocal track. Aspects of the vocal effects control system may be implemented in any suitable hardware (e.g., a karaoke machine) and/or software (e.g., a smart phone or tablet application, also referred to as an "app"). A time-based sequence of vocal effects, synchronized to the background musical accompaniment, may be generated and saved as a separate vocal effects timeline (VET) file (or files), along with parameter values relating to the vocal effects.

In a pre-production phase, a VET may be selected from a plurality of VETs for a given song, based on any suitable criteria, such as user style preference, user skill level, and/or user vocal range. The selected VET may then be modified before use, e.g., automatically based on user-related data and/or manually by the user.

During a production phase, the sequence of vocal effects defined by the VET (and possibly modified in pre-production) may then be applied to the vocals (e.g., to the vocal input) in real time and/or after the vocal track is recorded. Modifications to individual vocal effects may be made by the user, e.g., by adding instances of the same effect, adding new effects, or deleting, shortening, lengthening, and/or adjusting parameters of the vocal effects using the UI. The modified VET may be saved, e.g., as one or more data files, and the saved VET can be shared with other users and/or retained for later use by the same user.

The user interface may include multiple sections to facilitate user interaction and understanding of the VET and its relationship to the song (e.g., the background music and lyrics). For example, the UI may include an array of virtual toggle elements (e.g., buttons), each of which corresponds to one of the vocal effects (e.g., reverb, vocal harmony, radio voice, etc.). Alternatively or additionally, the UI may include scrolling vocal effect indicators (e.g., horizontal bars) synchronized to the selected audio background track, each of which indicates when a corresponding vocal effect is active within a timeline of the song. A timeline indicator element (e.g., a vertical line segment) may indicate, relative to the one or more scrolling vocal effect indicators, a current temporal position within the song. In some examples, the timeline indicator is stationary, while the scrolling bars move across the line (e.g., from right to left).

Examples, Components, and Alternatives

The following sections describe selected aspects of exemplary vocal effects control systems, as well as related devices and/or methods. The examples in these sections are intended for illustration and should not be interpreted as limiting the entire scope of the present disclosure. Each section may include one or more distinct embodiments or examples, and/or contextual or related information, function, and/or structure. Although the examples below refer to vocal effects being applied to vocal inputs or performances, a person of ordinary skill in the art will appreciate that identical methods and interfaces may be used with instrumental effects (e.g., guitar effects) on instrumental inputs (e.g., guitar performances).

A. Illustrative System and Device

As shown in FIG. 1, this section describes an illustrative vocal effects control system 100 suitable for implementing aspects of the vocal control devices and methods described above.

FIG. 1 is a schematic diagram of system 100 operating in an environment 102. System 100 may include any suitable electronic device 104 configured to perform digital audio signal processing using hardware, software, or a combination thereof. The signal processing may be visualized and controllable through a display 106 (e.g., a touch screen). In some examples, system 100 comprises a karaoke system. Device 104 is an example of a data processing system 1100, further described below. In some examples, device 104 comprises a smart phone, tablet, mobile device, personal computer, vocal processor, karaoke machine, or the like.

Device 104, in addition to display 106, may include an audio input 108, e.g., for receiving output of a microphone, and an audio output 110, e.g., for producing an output on a loudspeaker or headphones. One or more processors 112 may be in communication with a memory or storage device 114, and device 104 may be in communication with one or more other devices or networks via a communications module 116. The communications module may include an antenna (e.g., a Wi-Fi and/or cellular antenna).

Processor(s) 112 may function to execute one or more applications 118 stored in memory 114. Application(s) 118 may be configured to produce a graphical user interface (GUI) 120 on display 106. In some examples, application(s) 118 may be configured to play media files 122 (e.g., through audio output 110) and respond to inputs to GUI 120 to provide interactive control of one or more vocal effects 124. These vocal effects may be activated by application 118 with respect to a vocal input signal, which may be one of the media files or may be received via audio input 108. In some examples, effects 124 may include digital signal processing algorithms executed by application 118. In some examples, effects 124 may include processing performed by a digital signal processor of processor 112.

Media files 122 may include data relating to a plurality of songs available for playback on device 104. Further description of selected examples of media files 122 is provided in the next section below.

In some examples, an image capture device 126 may be coupled to device 104, such that video and/or still images may be captured by the user. For example, a user may wish to record a video performance to accompany the song, such as a video of the user or other performers singing and/or dancing to the music.

B. Illustrative Media Arrangement

Figure 2:
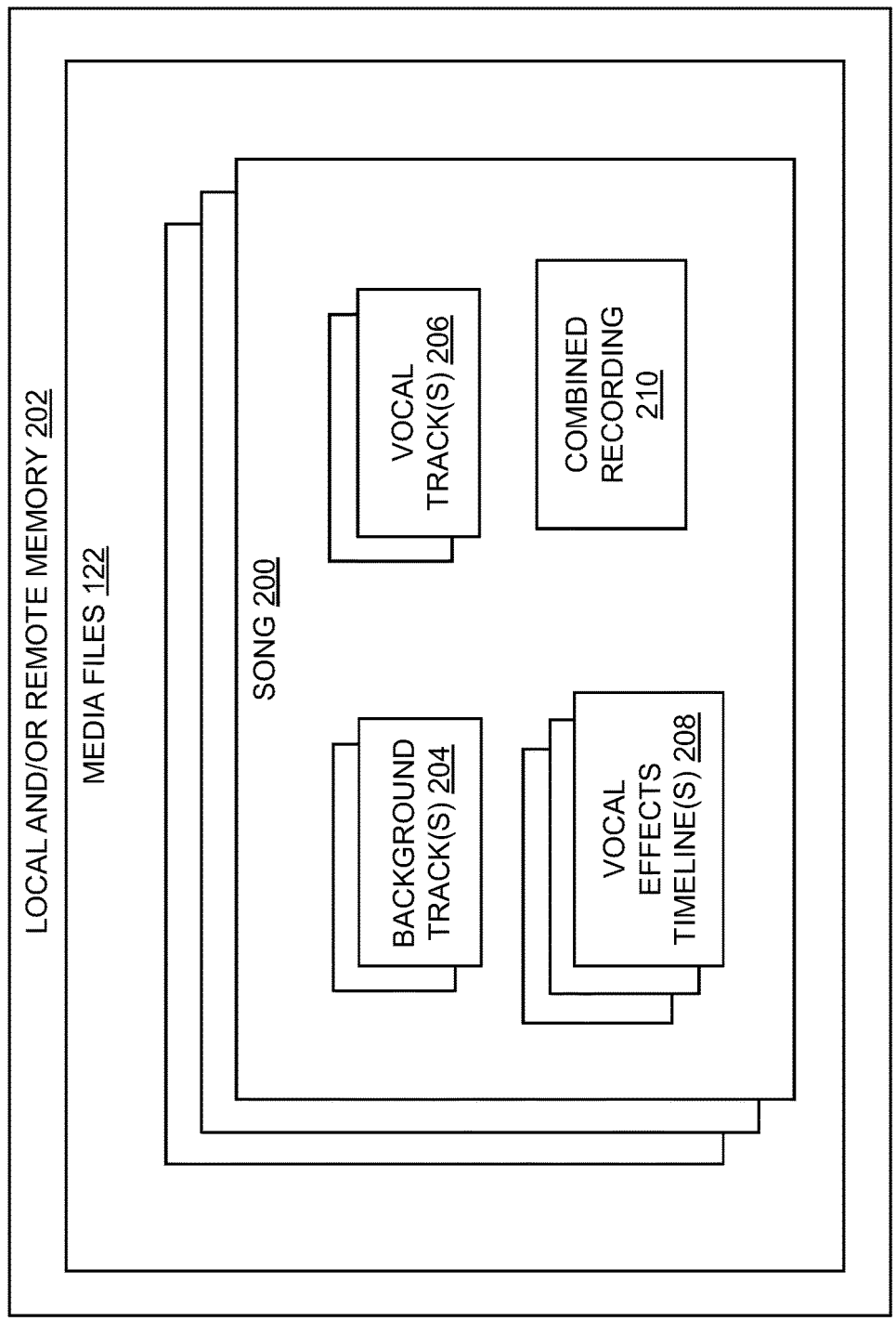
FIG. 2 is a schematic diagram of an illustrative file management system suitable for use with vocal effects control systems in accordance with the present disclosure.

As shown in FIG. 2, media files 122 may include a plurality of data files relating to one or more songs 200, stored in a local and/or remote memory 202. Memory 202 may include any suitable non-transitory computer-readable medium, including memory 114, an attached external memory, a remote memory (e.g., accessible over a network), and/or the like. In some cases, some media files 122 may be stored locally and others remotely. In some cases, selected media files 122 may be stored both locally and remotely.

Each song 200 may include a plurality of data files, such as an audio background track 204, a vocal track 206, and/or a vocal effects timeline 208. Background tracks 204 comprise the musical accompaniment for song 200 (e.g., instrumental music, beat-boxing, and/or the like), and may be available in multiple variations or arrangements selectable by the user. As mentioned above, in some examples background tracks 204 may be stored remotely and/or locally. In some examples, background tracks 204 may be streamable from a music streaming service or from remote storage rather than being stored locally before playback. In some examples, e.g., when performing a cappella, background track 204 may be absent or selectively excluded from song 200.

Vocal track 206 may include any suitable audio file comprising voice performance of song 200, e.g., lead vocals, back-up vocals, singing, rapping, and/or the like. Vocal track 206 is typically recorded live by the user, as when singing karaoke, or may be edited by the user after recording, or provided by another user for editing. Multiple vocal tracks may be recorded and/or available, e.g., for the same or different background tracks, and may be intended for separate or simultaneous playback with song 200.

Vocal effects timeline file(s) 208 (also referred to as a VET or vocal effects sequence) may include any suitable data files containing information about the types, start and stop times, and parameter settings of one or more vocal effects to be applied to a selected vocal track 206. VET 208 may comprise multiple data or metadata files, e.g., written in XML or Javascript Object Notation (JSON), outlining the vocal effect(s), settings, and temporal positions or timestamps within the song at which each vocal effect is to be started or stopped. Different VET files may contain different information, such as effect transitions, mixer changes, and global details (e.g., whether pitch correction or a key change is applied to the entire song). In some examples, the VET is a single file containing all relevant information. In some examples, the VET is split into several files. Multiple VETs 208 may be available for use and customization by the user, and the user may also create new VETs from scratch. As portable files, the VETs can be saved and/or shared with other users (e.g., over a network) for further use and/or customization.

When the user performs the vocal track for a selected song 200 using a selected background track 204 and VET 208, the audio performance may be recorded or saved as a recording 210. Recording 210 may comprise an audio-only or audio-plus-video (i.e., audiovisual) recording of the performance. Recording 210 captures the combination of the background track and the vocals as they would be experienced by a listener, with the vocals being modified by vocal effects according to the VET. However, recording 210 does not typically include information on the background track, vocal track, and VET separately. Accordingly, recording 210 may be shared or posted (e.g., on YouTube or SoundCloud) without revealing the VET settings or the original (dry) vocal track. In some cases, however, it may be possible for a user to save and share VET settings with another user, or preserve the settings for future reference.

C. Illustrative User Interfaces

As shown in FIGS. 3 through 8, this section describes various illustrative user interfaces (UI) suitable for use with system 100 and device 104 to select, play, record, and interactively control song elements and vocal effects. The user interfaces described in this section are examples of GUI 120, described above.

Figure 3:
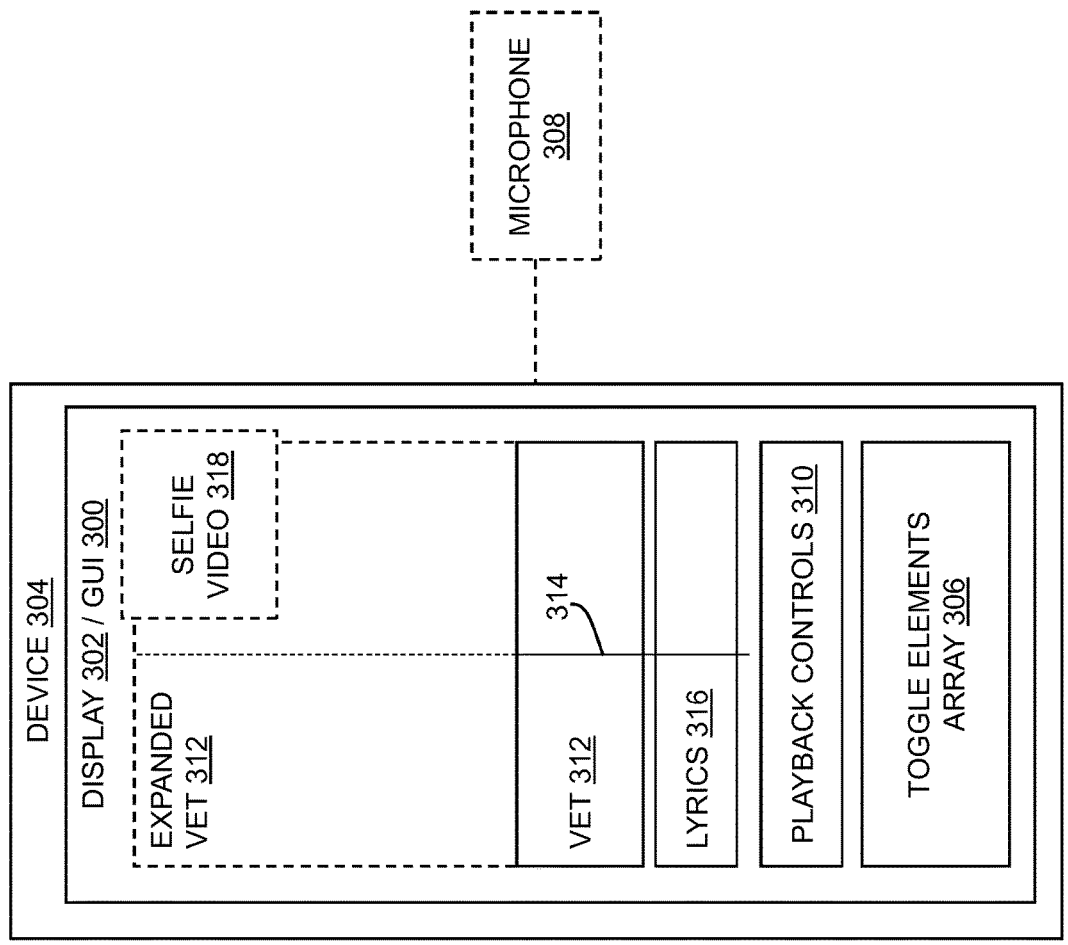
FIG. 3 is a schematic diagram of an illustrative device and user interface suitable for use with vocal effects control systems in accordance with the present disclosure.

FIG. 3 is a schematic diagram of a user interface 300 presented on a display 302 of an electronic device 304 (e.g., a smart phone, tablet, or karaoke machine). In this example, display 302 comprises a touch screen and user interface 300 comprises virtual elements selectable and manipulable via touch controls. However, other displays and interfaces may be used, such as a standard display using a mouse- or joystick-controlled cursor. In some examples, selected aspects of user interface 300 may comprise hardware embodiments, such as hardware buttons or sliders.

UI 300 may include multiple interface elements arranged in sections for convenience and efficiency. In this example, UI 300 includes an array of toggle elements 306, each of which corresponds to a respective vocal effect that may be applied to a vocal input, e.g., a pre-recorded dry vocal, or a vocal input from a microphone 308 in communication with device 304. The toggle elements will be controlled by the selected VET, but also interactively controllable and modifiable by a user. To provide visual indication of which effects are active during any particular part of the song, corresponding toggle elements may change their visual state or position during activation. For example, a toggle element may comprise a button that lights up, changes color, or is otherwise highlighted when that effect is active. As described above, the toggle elements may be interactive, such that a user can toggle any given effect or effects on or off as desired during playback of the song. This may be done during an experimentation mode, in which the changes are not recorded, or in a customization mode, in which the changes are saved as a custom VET.

UI 300 further includes a set of playback control elements 310 for controlling playback and recording of the song. For example, playback control elements 310 may include any suitable combination of a play button, a pause button, a stop button, a rewind button, a fast forward button, and/or the like.

To provide visual indication of how and when the effects are applied to the vocals over the timeline of the song, UI 300 includes a visualization of the vocal effects timeline (VET) 312, comprising one or more scrolling vocal effect indicators synchronized to the selected audio background track. Each of the vocal effect indicators shows when a corresponding one of the vocal effects is active within the timeline of the song, and may be examined in whole or in part to determine when each vocal effect is to be activated. The vocal effect indicators may include any suitable visual indication of the presence and duration of a corresponding vocal effect. For example, a horizontal line or bar may be present when the vocal effect is active, with a length of the line or bar corresponding to the length of activation. Intermittent or repeated activation of the vocal effect is represented by a series of line or bar segments punctuated by blank space when the effect is inactive. Each of the lines or bars may be assigned to a horizontal track (typically hidden) in which the bars scroll, e.g., from right to left, across the display. In other examples, vocal effect indicators may scroll vertically and/or have other shapes or attributes. Different vocal effect indicators may have different characteristics to assist in visual identification, such as when each indicator has an assigned color. VET visualization section 312 may be expanded or collapsed, to take up more or less of display 302 as indicated in FIG. 3.

To provide a temporal reference point, UI 300 may include a timeline indicator element 314 configured to indicate, relative to scrolling vocal effect indicators 312, a current temporal position within the song. For example, as shown in FIG. 3, timeline indicator element 314 may comprise a vertical line or "needle" against which the vocal effect indicators scroll horizontally. In this example, any vocal effect indicator intersecting timeline indicator element 314 would be activated. This permits the user to see which vocal effects are applied, relative to the song and the lyrics as well as relative to other effects, and to anticipate when each effect will begin or end.

To aid the user in vocal performance and effects modification, a lyrics section 316 may be included in UI 300. In some examples, lyrics section 316 includes words scrolling across the display, synchronized to the background track. In some examples, a scrolling audio waveform of the vocal input is displayed.

UI 300 may include a video or still image section 318 selectable by the user. In some examples, the user may utilize a camera coupled to device 304 to capture and display self-imagery or may play a video file provided with the selected background track. In some examples, additional song information may be presented in section 318, such as lyrics or information on the original artist.

FIGS. 4 and 5 depict two configurations of another illustrative user interface 400, which is substantially similar to UI 300. FIG. 4 depicts UI 400 with an expanded VET section, and FIG. 5 depicts UI 400 with a collapsed VET section.

UI 400 includes an array 402 of buttons 404, which are examples of toggle elements 306, described above. Buttons 404 are arranged in a two by four matrix, although more or fewer buttons may be arranged in any suitable fashion. Each button 404 may correspond to a different respective vocal effect, as indicated by the letters A through H. These letters represent any suitable indicia for identifying the vocal effects, such as icons, images, and/or text. Tapping on a button 404 when it is active may result in deactivation of the corresponding effect. Similarly, tapping on a button 404 when it is inactive may result in activation of the effect. Using this interface, the user may turn effects on or off at desired times during the song, including editing existing effect sequences.

UI 400 also includes a lyrics section 406 that presents the lyrics of a song being played, scrolling across the display and synchronized to the background track. A timeline indicator element 408 is provided to visually indicate the present temporal position within the song. In this example, timeline indicator element 408 is a stationary vertical line, and the lyrics scroll across this line from right to left.

UI 400 includes a VET section 409, which is shown in two different modes or configurations (e.g., selectable by the user): expanded in FIG. 4 and collapsed in FIG. 5. In both modes, VET section 409 comprises scrolling vocal effect indicators 410 assigned to horizontal tracks or lanes through which the indicators scroll from right to left, as indicated by arrow 412. This may also be described as stacking the indicators in layers. In this example, vocal effect indicators 410 are bars or lines having segment lengths that correspond to the time-discrete activations of the corresponding effect. As with the lyrics, vocal effect indicators 410 scroll relative to the screen and relative to timeline indicator element 408, to indicate the current temporal position (e.g., time) in the song timeline.

Accordingly, it is evident from FIGS. 4 and 5 that the current temporal position within the song is somewhere in the middle of the word "then" and that vocal effects C and E are active. The active effects are displayed in two ways: first, by changing the visual state of the corresponding buttons 404, and second, by having the visual effect indicators intersecting the timeline indicator (at 414 and 416). To aid in identification of the individual vocal effect indicators 410, an icon or reproduction of the corresponding button 404 may be presented at one end of the respective lane for that effect, as shown at 418 in FIG. 4. The vocal effect indicators may also match buttons 404 in other characteristics, such as color (e.g., the button and the bars for effect A may both be orange, etc.).

In some examples, each of the vocal effect indicators may be selectable (e.g., by tapping or clicking on the indicator segment), which may trigger a display of further information and/or a menu of editing choices, not depicted. The further information may include vocal effect name, duration, combination of multiple effects in use, associated parameters, start/stop/duration, and/or the like. The editing menu may include options to delete the segment or to adjust parameters relating to the vocal effect for that segment. For example, a user may tap on the segment shown for effect C, and select "delete" from the resulting menu. Possibly after a confirmation dialog, this action would remove that discrete activation of effect C from the VET, along with its corresponding effect on the vocal track. Other options may include adjustment of parameter settings for that effect with respect to that segment, adjustment of the effect's magnitude, etc. In some examples, start and stop times may be adjustable by this method. Adjustment of the effect's magnitude may be facilitated using any suitable UI element, such as a slider, fader, or rotatable knob.

As depicted in FIG. 5, collapsing VET section 409 makes room for additional content 420, which may include video, still imagery, song information, live camera feed(s), and/or the like, and may be selectable by the user.

Figure 7:
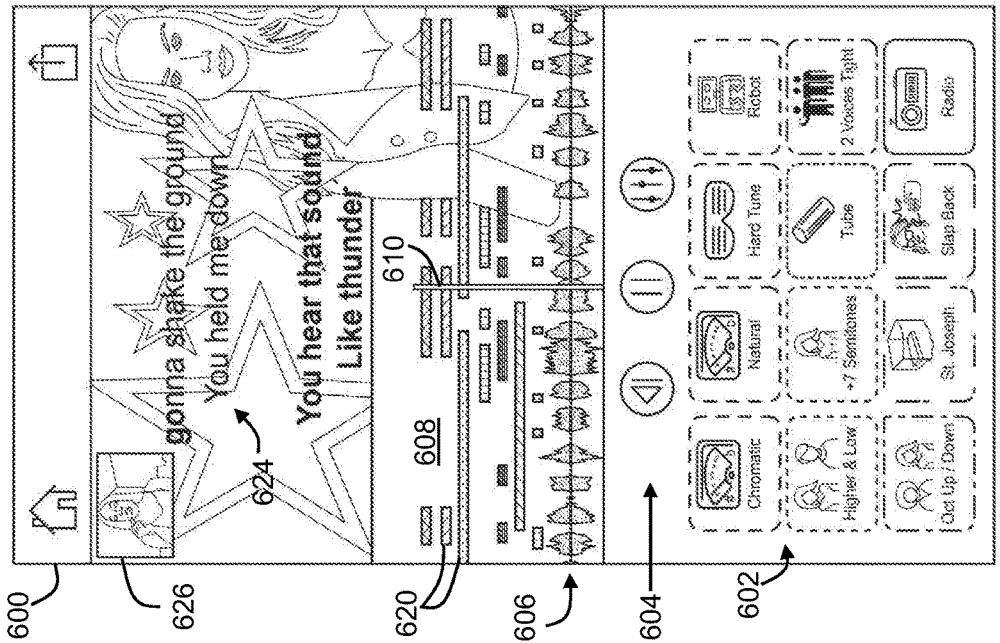
FIG. 7 depicts the second illustrative user interface in a collapsed configuration.
Figure 6:
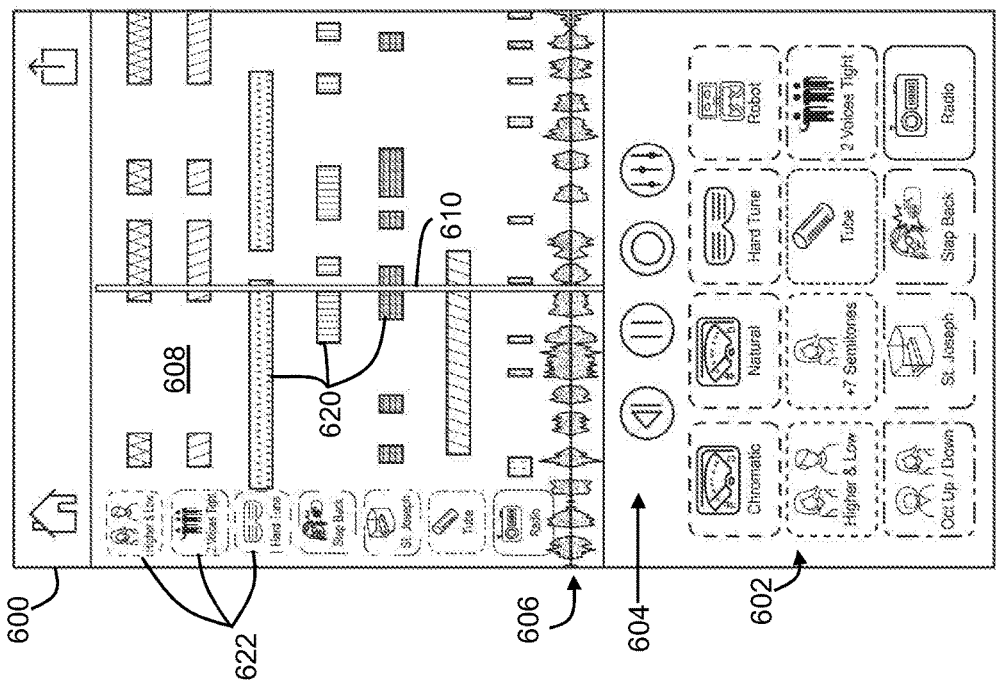
FIG. 6 depicts a second illustrative user interface in an expanded configuration.

FIGS. 6 and 7 depict another user interface 600, which is another example or variation of UI 300, described above. In this example, UI 600 is shown in a first configuration in FIG. 6, with the VET section expanded and at a first temporal position within the song, and in a second configuration in FIG. 7, with the VET section collapsed and at a second, slightly later, temporal position within the song.

As with UI 300, UI 600 includes an array of toggle elements or buttons 602 corresponding to available vocal effects, a playback controls section 604, a vocal waveform section 606 in place of lyrics, and a VET section 608 scrollable against a timeline indicator element 610, all substantially as described above. In this example, buttons 602 include both visual and textual indicators that identify which vocal effect is controlled by the respective button.

Playback controls 604 include (from left to right in the drawings) a rewind button, a pause button, a record button, and a settings button. The rewind and pause buttons control playback of the background track, and the record button allows a user to selectively record the performance, along with any changes to the VET. As described above, the combined performance may be recorded with effects incorporated, i.e., as a single sound file, and/or the updated VET may be saved separately. The settings button may be provided to trigger one or more additional menus or control screens for adjusting parameter settings and/or global variables. As shown in FIG. 7, the record button may be hidden, e.g., when unavailable or already activated.

VET section 608 includes scrolling vocal effect indicators 620 in the form of horizontal bars, which may be of different colors or otherwise distinguishable from each other. In the expanded configuration (see FIG. 6), a set of icons 622 are arrayed at the left of the screen, with each icon 622 corresponding to a respective button 602 and identifying the horizontal lane in which that effect's indicator bars will travel across the display.

With reference to FIG. 7, the collapsed VET configuration opens up space at the top portion of UI 600 for other information to be presented. In this example, a stylized still image of the original artist is presented behind a vertically scrolling sequence of song lyrics 624, which may be similar to typical karaoke applications. Additionally, in this example, an inset video window 626 is shown, e.g., fed from an image capturing device coupled to the device. This may be from a front-facing camera of a smart phone or tablet, or another video camera for capturing the user's performance.

Figure 8:
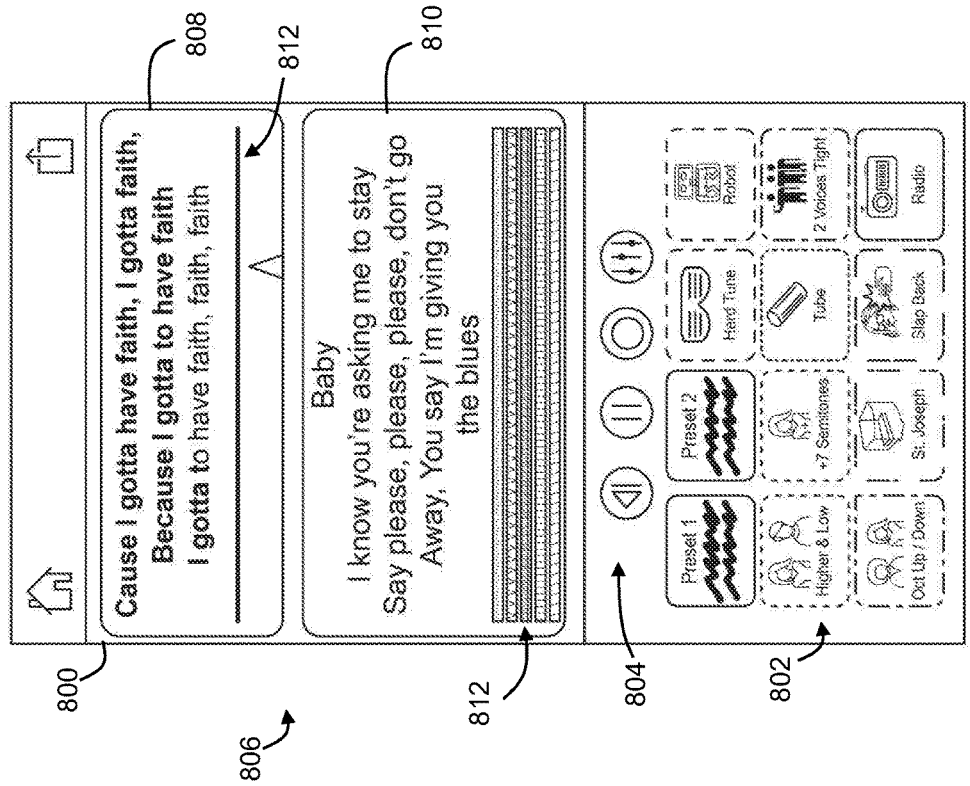
FIG. 8 depicts a third illustrative user interface.

FIG. 8 depicts another, slightly different user interface 800. UI 800 takes advantage of examples in which songs are subdivided into sections, such as intro, chorus, bridge, verses 1 through n, etc. Defining the different sections of a song may be done at any suitable point, such as when the original background track is generated and saved, or by a third party afterward. When the different sections of the song are identifiable, e.g., from markers added to the background audio file and/or lyrics file, different vocal effects may be applied in bulk by song section instead of (or in addition to) at any temporal position within the song's timeline. In other words, selected vocal effects may be defined in a VET or vocal effect sequence to be activated when certain song sections are played. Vocal effects may be added, removed, or have their parameter settings adjusted by section. Two such song sections are depicted on UI 800 in FIG. 8, as further described below.

UI 800 includes a button array 802 substantially similar to arrays 306, 402, and 602, and playback controls 804 substantially similar to playback controls 604. UI 800 also includes a vocal effects timeline (VET) 806 which presents song sections, e.g., first song section 808 and second song section 810, as vertically scrolling blocks of lyrics with accompanying vocal effect indicators 812. Each of the vocal effect indicators 812 corresponds to a respective one of buttons 802 and a respective vocal effect active during that song section. As with the other user interfaces, buttons 802 may be toggled as desired by the user to turn effects on or off. In this example, toggling of an effect may apply to the entire song section rather than toggling at a precise temporal point within the song timeline. Further, in this example, button array 802 includes "Preset 1" and "Preset 2" options, each of which represents a previously defined and saved combination of one or more effects. This allows a user to apply a desired combination of vocal effects repeatedly, without the need to recreate the combination over and over.

D. Illustrative Method of Use

Figure 9:
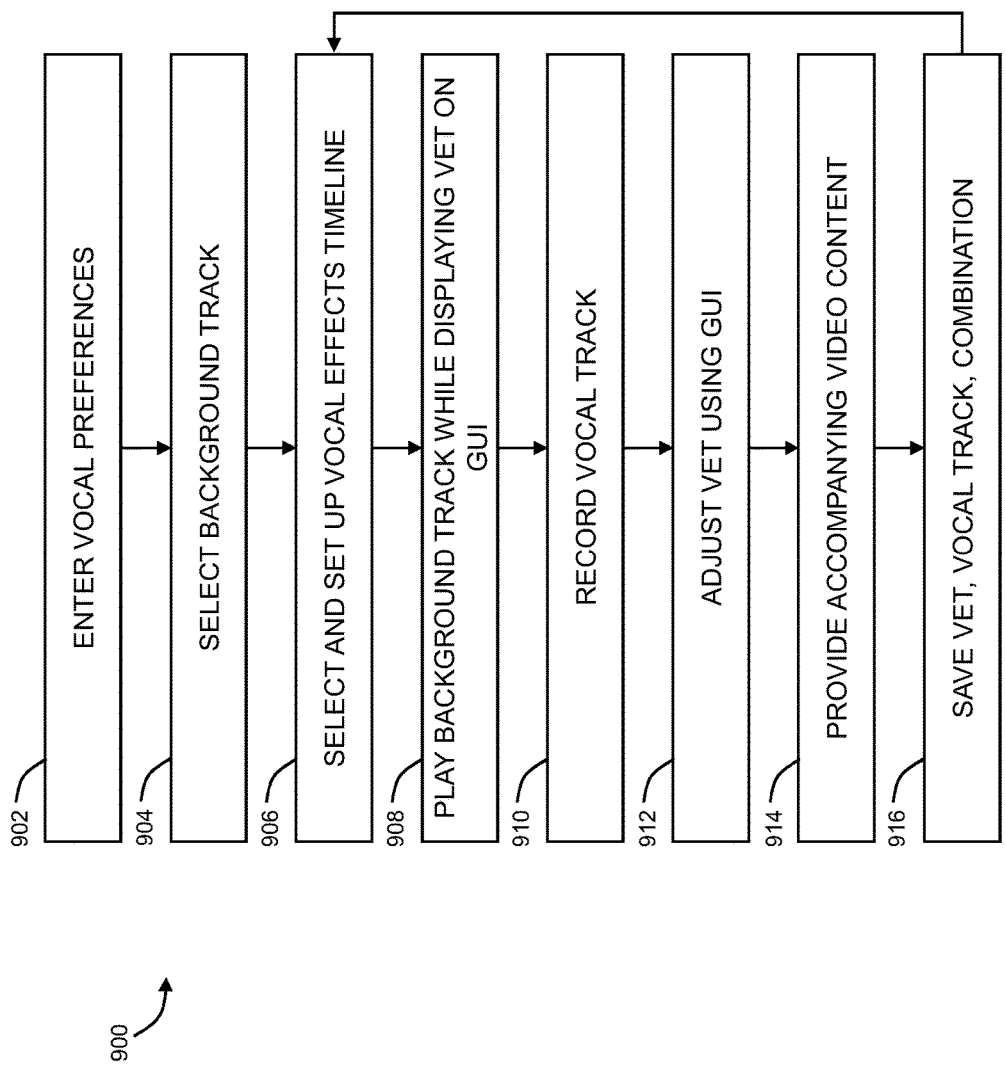
FIG. 9 is a flow chart depicting steps in an illustrative method of using a vocal effects control system in accordance with aspects of the present disclosure.

This section describes steps of an illustrative method 900 for interactively producing a recorded song using a vocal effects control system as described above (e.g., including a VET, a background track, and a user interface for controlling the vocal effects sequence); see FIG. 9. Aspects of devices, file structures, and/or user interfaces described above may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. FIG. 9 depicts multiple steps which may be performed in conjunction with karaoke devices, applications, and user interfaces according to aspects of the present disclosure. Although various steps of method 900 are described below and depicted in FIG. 9, the steps need not necessarily all be performed, and in some cases may be performed in a different order than the order shown.

At step 902, voice-related parameters may be obtained from a user and recorded using an application on a suitable electronic device, such parameters including, for example, vocal preferences, criteria, and/or limitations regarding musical performance. These may include information such as vocal range, skill level, musical style preference, pitch accuracy, and/or the like. In some examples, user-related parameters may be determined automatically, such as by analysis of a singing sample. In some examples, user-related parameters and information may include skill level, effect preferences (e.g., light, moderate, heavy), natural vocal tone, vocal register (e.g., low, med, high), ability to sing in key and match pitch, historical performance analytics, preferred music style or genre (e.g., retro, modern, etc.).

At step 904, a user may select a background track for the desired song to be performed. As described above, each song may have multiple available background tracks, depending on style, tempo, performers, instrument choice, etc. Selection may be made from various sources, such as songs available on the user's device, songs available online, songs available from a streaming service, songs available over a local network, and/or the like. A menu of sources and song choices may be presented to the user for this task. In some examples, user data and preferences may be used to retrieve the most appropriate or customized choices, make suggestions, and/or filter options.

At step 906, the user may select a vocal effects timeline (VET) and set up various parameters relating to the VET. A selected VET may be used as-is, or adjusted and modified in a pre-production phase. As with the background track, one or more VETs may be available for selection by the user for any given song. For example, various stock VETs may be pre-authored and provided for selection by the user, including options such as professional- or novice-level effects sequences. A default VET may be assigned by the application, based on user preferences or settings. In some examples, a blank or empty VET may be selected, wherein certain global parameters may be set (e.g., key, vocal range) but no individual vocal effects are sequenced. Such a blank VET may be used when a user wishes to create a custom VET from scratch rather than using one as-is or modifying an existing VET.

After selecting a VET, the user and/or the application may set certain parameters relating to the VET, such as the key the vocals will be sung in, the degree of pitch correction, and/or volume of harmony effects. Auto-detection of the key may be performed by the application, which may facilitate automatic pitch correction and harmony effects. Certain settings may affect the entire song, while others may affect portions, such as more difficult sections.

At step 908, the user plays the selected background track on the device while displaying the selected VET on the GUI. In some examples, the user may test the VET by playing the song and singing, for example using a microphone coupled to the device, to hear the VET applied to the user's live performance. Functionality may be provided such that the user can mute and/or lower the magnitude of the vocal effect(s) when desired to assess the impact of the effect(s). In some examples, the user may listen to the VET as applied to a sample vocal track or another user's vocal performance.

At step 910, the user generates, and in some cases records, a vocal track for the song by singing along to the background track. As the user sings, the sequence of vocal effects defined by the VET will modify the vocal track in accordance with the respective vocal effect algorithms. A "punch in/punch out" function may be provided, with which the user can rerecord parts of the performance rather than being required to redo the entire performance.

At step 912, the user may adjust the VET using the GUI. For example, new vocal effects may be added, or existing vocal effects may be deleted, modified, repeated, lengthened, shortened, and/or the like, or any combination of these. Various illustrative modification techniques and mechanisms are described above with respect to the various user interface examples.

At step 914, the user may optionally provide an accompanying video content or still imagery for incorporation into the performance. For example, the user may record him or herself performing the vocals, e.g., using a camera coupled to the device. Alternatively or additionally, other video and still image content may also be incorporated. In some examples, video content may be recorded simultaneously with the vocal track.

At step 916, various aspects of the production may be saved and/or shared, e.g., over a network. For example, the resulting customized VET and/or the dry vocal track may be saved as separate files (or groups of files). In some examples, a combination of the background track and vocals, as modified by the VET, may be recorded as a single audio file, or as a single audiovisual file when combined with video and/or images.

E. Illustrative Method for Displaying and Modifying Digital Signal Processing Effects This section describes steps of an illustrative computer-implemented method 1000 for displaying and modifying digital signal processing effects; see FIG. 10. Aspects of devices, file saving systems, and/or user interfaces described above, as well as related methods, may be utilized in the method steps described below. Where appropriate, reference may be made to components and systems that may be used in carrying out each step. These references are for illustration, and are not intended to limit the possible ways of carrying out any particular step of the method.

Figure 10:
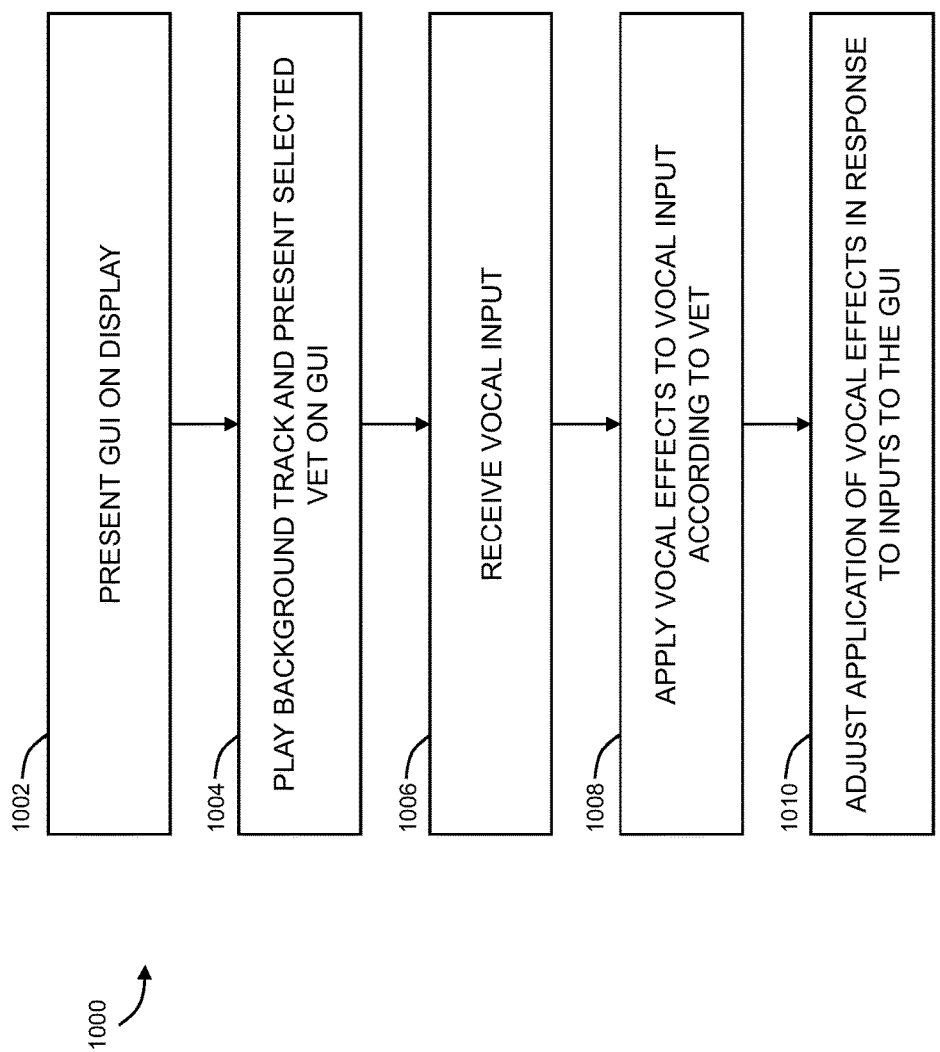
FIG. 10 is a flow chart depicting steps in an illustrative method of displaying and modifying a vocal effects sequence in accordance with aspects of the present disclosure.

FIG. 10 is a flowchart illustrating steps performed in an illustrative method, and may not recite the complete process or all steps of the method. Although various steps of method 1000 are described below and depicted in FIG. 10, the steps need not necessarily all be performed, and in some cases may be performed in a different order than the order shown.

At step 1002, a graphical user interface (GUI) is presented on a display of an electronic device comprising a speaker output, a microphone input, and a processor configured to execute digital signal processing (DSP) algorithms. Examples of suitable GUIs are described above with reference to FIGS. 3 through 8.

In method 1000, the GUI may include an array of toggle elements (e.g., elements 306, 402, 602, 802), each toggle element corresponding to one of the plurality of vocal effects; one or more scrolling vocal effect indicators (e.g., indicators 410, 620) synchronized to a selected audio background track of a song, each of the one or more vocal effect indicators indicating when a corresponding one of the vocal effects is to be active within a timeline of the song; and a timeline indicator element (e.g., element 314, 408, 610) configured to indicate, relative to the one or more scrolling vocal effect indicators, the current temporal position within the song.

At step 1004, the audio background track is played, via the speaker output, while a selected vocal effects sequence comprising time-based information related to a plurality of vocal effects (i.e., a vocal effects timeline, or VET) is presented via the UI. In some examples, method 1000 may include automatically selecting the vocal effects sequence based on one or more parameters specified by a user, and/or pre-modifying the selected vocal effects sequence based on a vocal range of the user.

At step 1006, vocal input is received via a microphone input. For example, a user may sing into a connected microphone, or may sing into a microphone that is built-in or incorporated into the device.

At step 1008, the vocal effects are applied to the vocal input using the DSP algorithms, according to the selected vocal effects sequence, e.g., when indicated on the timeline. In some examples, method 1000 includes scrolling the vocal effects indicators across the display relative to the timeline indicator element, and changing, in response to activation of the corresponding vocal effect, a visual state of the respective toggle element.

At step 1010, application of the vocal effects is automatically adjusted in response to inputs to the GUI. In some examples, this step may include responding to an input to the GUI that toggles one of the toggle elements at a selected temporal position within the song by toggling activation of the corresponding vocal effect and the corresponding scrolling vocal effect indicator at the selected temporal position. For example, tapping a virtual button may toggle a corresponding vocal effect on or off at a certain time in the song. Other control methods may be used to interact with the user interface, such as voice commands and hand gestures recognized by the device.

In some examples, method 1000 includes saving adjustments made to the vocal effects as a modified vocal effects sequence (e.g., VET file(s) 208) that may be communicated to another electronic device.

F. Illustrative Data Processing System

Figure 11:
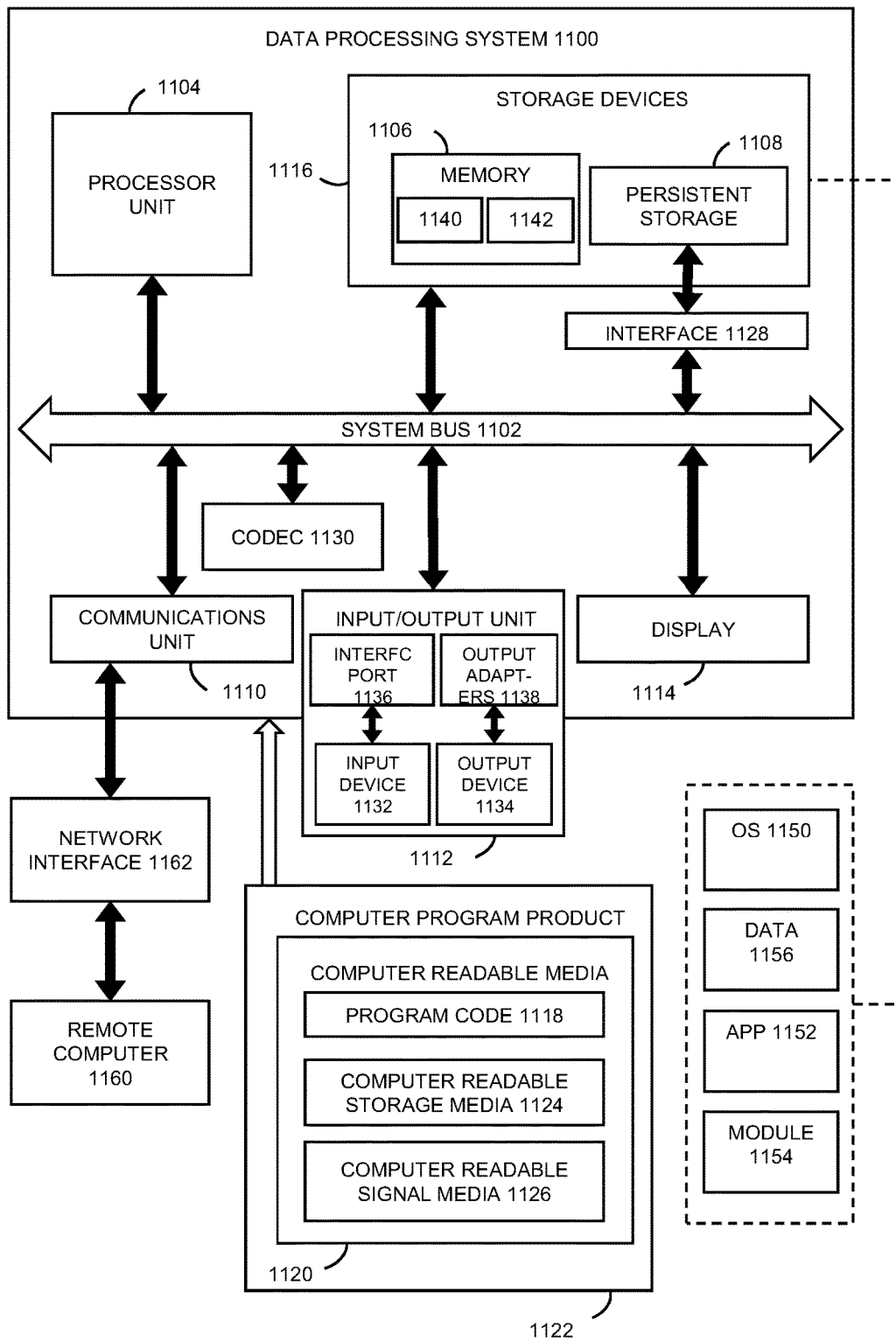
FIG. 11 is a schematic diagram of a data processing system suitable for use in aspects of the present disclosure.

As shown in FIG. 11, this example describes a data processing system 1100 (also referred to as a computer, computing system, and/or computer system) in accordance with aspects of the present disclosure. In this example, data processing system 1100 is an illustrative data processing system suitable for implementing aspects of the vocal effects control system. More specifically, in some examples, devices that are embodiments of data processing systems (e.g., smartphones, tablets, karaoke machines, personal computers) may run applications and present user interfaces to facilitate control of vocal effects as described above. In some examples, server computers may store and communicate certain media files to and/or from the user's device. In some examples, digital audio signal processing algorithms may be executed (to provide vocal effects) by data processing systems described here, for example on the user's device and/or remotely (e.g., in the cloud).

In this illustrative example, data processing system 1100 includes a system bus 1102 (also referred to as communications framework). System bus 1102 may provide communications between a processor unit 1104 (also referred to as a processor or processors), a memory 1106, a persistent storage 1108, a communications unit 1110, an input/output (I/O) unit 1112, a codec 1130, and/or a display 1114. Memory 1106, persistent storage 1108, communications unit 1110, input/output (I/O) unit 1112, display 1114, and codec 1130 are examples of resources that may be accessible by processor unit 1104 via system bus 1102.

Processor unit 1104 serves to run instructions that may be loaded into memory 1106. Processor unit 1104 may comprise a number of processors, a multi-processor core, and/or a particular type of processor or processors (e.g., a central processing unit (CPU), graphics processing unit (GPU), etc.), depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device may include any suitable hardware capable of storing information (e.g., digital information), such as data, program code in functional form, and/or other suitable information, either on a temporary basis or a permanent basis.

Storage devices 1116 also may be referred to as computer-readable storage devices or computer-readable media. Memory 1106 may include a volatile storage memory 1140 and a non-volatile memory 1142. In some examples, a basic input/output system (BIOS), containing the basic routines to transfer information between elements within the data processing system 1100, such as during start-up, may be stored in non-volatile memory 1142. Persistent storage 1108 may take various forms, depending on the particular implementation.

Persistent storage 1108 may contain one or more components or devices. For example, persistent storage 1108 may include one or more devices such as a magnetic disk drive (also referred to as a hard disk drive or HDD), solid state disk (SSD), floppy disk drive, tape drive, Jaz drive, Zip drive, LS-110 drive, flash memory card, memory stick, and/or the like, or any combination of these. One or more of these devices may be removable and/or portable, e.g., a removable hard drive. Persistent storage 1108 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 1108 to system bus 1102, a removable or non-removable interface is typically used, such as interface 1128.

Input/output (I/O) unit 1112 allows for input and output of data with other devices that may be connected to data processing system 1100 (i.e., input devices and output devices). For example, input device 1132 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 1104 through system bus 1102 via interface port(s) 1136. Interface port(s) 1136 may include, for example, a serial port, a parallel port, a game port, and/or a universal serial bus (USB).

Output devices 1134 may use some of the same types of ports, and in some cases the same actual ports, as input device(s) 1132. For example, a USB port may be used to provide input to data processing system 1100 and to output information from data processing system 1100 to an output device 1134. Output adapter 1138 is provided to illustrate that there are some output devices 1134 (e.g., monitors, speakers, and printers, among others) which require special adapters. Output adapters 1138 may include, e.g. video and sounds cards that provide a means of connection between the output device 1134 and system bus 1102. Other devices and/or systems of devices may provide both input and output capabilities, such as remote computer(s) 1160. Display 1114 may include any suitable human-machine interface or other mechanism configured to display information to a user, e.g., a CRT, LED, or LCD monitor or screen, etc.

Communications unit 1110 refers to any suitable hardware and/or software employed to provide for communications with other data processing systems or devices. While communication unit 1110 is shown inside data processing system 1100, it may in some examples be at least partially external to data processing system 1100. Communications unit 1110 may include internal and external technologies, e.g., modems (including regular telephone grade modems, cable modems, and DSL modems), ISDN adapters, and/or wired and wireless Ethernet cards, hubs, routers, etc. Data processing system 1100 may operate in a networked environment, using logical connections to one or more remote computers 1160. A remote computer(s) 1160 may include a personal computer (PC), a server, a router, a network PC, a workstation, a microprocessor-based appliance, a peer device, a smart phone, a tablet, another network note, and/or the like. Remote computer(s) 1160 typically include many of the elements described relative to data processing system 1100. Remote computer(s) 1160 may be logically connected to data processing system 1100 through a network interface 1162 which is connected to data processing system 1100 via communications unit 1110. Network interface 1162 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 1130 may include an encoder, a decoder, or both, comprising hardware, software, or a combination of hardware and software. Codec 1130 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 1130 is depicted as a separate component, codec 1130 may be contained or implemented in memory, e.g., non-volatile memory 1142.

Non-volatile memory 1142 may include read only memory (ROM), programmable ROM (PROM), electrically programmable ROM (EPROM), electrically erasable programmable ROM (EEPROM), flash memory, and/or the like, or any combination of these. Volatile memory 1140 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 1116, which are in communication with processor unit 1104 through system bus 1102. In these illustrative examples, the instructions are in a functional form in persistent storage 1108. These instructions may be loaded into memory 1106 for execution by processor unit 1104. Processes of one or more embodiments of the present disclosure may be performed by processor unit 1104 using computer-implemented instructions, which may be located in a memory, such as memory 1106.

These instructions are referred to as program instructions, program code, computer usable program code, or computer-readable program code executed by a processor in processor unit 1104. The program code in the different embodiments may be embodied on different physical or computer-readable storage media, such as memory 1106 or persistent storage 1108. Program code 1118 may be located in a functional form on computer-readable media 1120 that is selectively removable and may be loaded onto or transferred to data processing system 1100 for execution by processor unit 1104. Program code 1118 and computer-readable media 1120 form computer program product 1122 in these examples. In one example, computer-readable media 1120 may comprise computer-readable storage media 1124 or computer-readable signal media 1126.

Computer-readable storage media 1124 may include, for example, an optical or magnetic disk that is inserted or placed into a drive or other device that is part of persistent storage 1108 for transfer onto a storage device, such as a hard drive, that is part of persistent storage 1108. Computer-readable storage media 1124 also may take the form of a persistent storage, such as a hard drive, a thumb drive, or a flash memory, that is connected to data processing system 1100. In some instances, computer-readable storage media 1124 may not be removable from data processing system 1100.

In these examples, computer-readable storage media 1124 is a physical or tangible storage device used to store program code 1118 rather than a medium that propagates or transmits program code 1118. Computer-readable storage media 1124 is also referred to as a computer-readable tangible storage device or a computer-readable physical storage device. In other words, computer-readable storage media 1124 is media that can be touched by a person.

Alternatively, program code 1118 may be transferred to data processing system 1100, e.g., remotely over a network, using computer-readable signal media 1126. Computer-readable signal media 1126 may be, for example, a propagated data signal containing program code 1118. For example, computer-readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer-readable signal media 1126 for use within data processing system 1100. For instance, program code stored in a computer-readable storage medium in a server data processing system may be downloaded over a network from the server to data processing system 1100. The computer providing program code 1118 may be a server computer, a client computer, or some other device capable of storing and transmitting program code 1118.

In some examples, program code 18 may comprise be an operating system (OS) 1150. Operating system 1150, which may be stored on persistent storage 1108, controls and allocates resources of data processing system 1100. One or more applications 1152 take advantage of the operating system's management of resources via program modules 1154, and program data 1156 stored on storage devices 1116. OS 1150 may include any suitable software system configured to manage and expose hardware resources of computer 1100 for sharing and use by applications 1152. In some examples, OS 1150 provides application programming interfaces (APIs) that facilitate connection of different type of hardware and/or provide applications 1152 access to hardware and OS services. In some examples, certain applications 1152 may provide further services for use by other applications 1152, e.g., as is the case with so-called "middleware." Aspects of present disclosure may be implemented with respect to various operating systems or combinations of operating systems.

The different components illustrated for data processing system 1100 are not meant to provide architectural limitations to the manner in which different embodiments may be implemented. One or more embodiments of the present disclosure may be implemented in a data processing system that includes fewer components or includes components in addition to and/or in place of those illustrated for computer 1100. Other components shown in FIG. 11 can be varied from the examples depicted. Different embodiments may be implemented using any hardware device or system capable of running program code. As one example, data processing system 1100 may include organic components integrated with inorganic components and/or may be comprised entirely of organic components (excluding a human being). For example, a storage device may be comprised of an organic semiconductor.

In some examples, processor unit 1104 may take the form of a hardware unit having hardware circuits that are specifically manufactured or configured for a particular use, or to produce a particular outcome or progress. This type of hardware may perform operations without needing program code 1118 to be loaded into a memory from a storage device to be configured to perform the operations. For example, processor unit 1104 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 1118) may be implemented as hardware, e.g., by specifying an FPGA configuration using a hardware description language (HDL) and then using a resulting binary file to (re)configure the FPGA.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, system bus 1102 may comprise one or more buses, such as a system bus or an input/output bus. Of course, the bus system may be implemented using any suitable type of architecture that provides for a transfer of data between different components or devices attached to the bus system. System bus 1102 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 1110 may include a number of devices that transmit data, receive data, or both transmit and receive data. Communications unit 1110 may be, for example, a modem or a network adapter, two network adapters, or some combination thereof. Further, a memory may be, for example, memory 1106, or a cache, such as that found in an interface and memory controller hub that may be present in system bus 1102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

G. Additional Examples and Illustrative Combinations

This section describes additional aspects and features of vocal effects control systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system comprising:
a display;
a microphone;
a speaker;
a non-transitory computer-readable memory storing media files relating to a plurality of songs available for playback on the system;
a processor in communication with the display, the microphone, the speaker, and the memory; and
a plurality of instructions executable by the processor to:
present a user interface (UI) on the display;
play, on the speaker, an audio background track of a selected one of the songs, while simultaneously presenting, via the UI, a selected vocal effects sequence comprising timeline information related to a plurality of vocal effects;
receive vocal input from the microphone;
apply the vocal effects to the vocal input according to the selected vocal effects sequence; and
adjust application of the vocal effects in response to inputs to the UI;
wherein the UI includes:
an array of toggle elements, each toggle element corresponding to one of the plurality of vocal effects;
one or more scrolling vocal effect indicators synchronized to the selected audio background track, each of the one or more vocal effect indicators indicating when a corresponding one of the vocal effects is active within a timeline of the song; and
a timeline indicator element configured to indicate, relative to the one or more scrolling vocal effect indicators, a current temporal position within the song;
wherein the processor is configured to respond to an input to the UI that toggles one of the toggle elements at a selected temporal position within the song by toggling activation of the corresponding vocal effect and the corresponding scrolling vocal effect indicator at the selected temporal position.

A1. The system of A0, wherein the UI comprises a graphical user interface (GUI).

A2. The system of A0, wherein the media files relating to the plurality of songs include a plurality of vocal effects sequences related to a same one of the songs.

A3. The system of A0, wherein the toggle elements comprise button elements.

A4. The system of A3, wherein the button elements change visual state when toggled.

A5. The system of A0, wherein the UI further comprises a selectably displayable fader element configured to adjust a volume level of at least one of the vocal effects.

A6. The system of A0, wherein the one or more scrolling vocal effect indicators are selectable and modifiable via the UI.

A7. The system of A0, wherein the scrolling vocal effect indicators are configured to scroll horizontally with respect to the display, the timeline indicator element being stationary and substantially perpendicular with respect to the vocal effect indicators.

B0. A computer-implemented method comprising:
presenting a graphical user interface (GUI) on a display of an electronic device comprising a speaker output, a microphone input, and a processor configured to execute digital signal processing (DSP) algorithms;
simultaneously playing, via the speaker output, an audio background track of a selected song, and presenting, via the UI, a selected vocal effects sequence comprising time-based information related to a plurality of vocal effects;
receiving vocal input via the microphone input;
applying the vocal effects to the vocal input using the DSP algorithms according to the selected vocal effects sequence; and
automatically adjusting application of the vocal effects in response to inputs to the GUI;
wherein the GUI includes:
an array of toggle elements, each toggle element corresponding to one of the plurality of vocal effects;
one or more scrolling vocal effect indicators synchronized to the selected audio background track, each of the one or more vocal effect indicators indicating when a corresponding one of the vocal effects is active within a timeline of the song; and
a timeline indicator element configured to indicate, relative to the one or more scrolling vocal effect indicators, the current temporal position within the song.

B1. The method of B0, wherein automatically adjusting application of the vocal effects in response to inputs to the GUI includes responding to an input to the GUI that toggles one of the toggle elements at a selected temporal position within the song by toggling activation of the corresponding vocal effect and the corresponding scrolling vocal effect indicator at the selected temporal position.

B2. The method of B0, further comprising:
saving adjustments made to the vocal effects as a modified vocal effects sequence.

B3. The method of B2, further comprising:
communicating the modified vocal effects sequence to another electronic device.

B4. The method of B0, further comprising:
automatically selecting the vocal effects sequence based on one or more parameters specified by a user; and
modifying the selected vocal effects sequence based on a vocal range of the user.

C0. A device comprising:
an electronic device including a processor, an audio input, an audio output, and a display, the processor configured to present a graphical user interface (GUI) on the display;
wherein the GUI includes:
an array of toggle elements, each toggle element corresponding to one of a plurality of vocal effects applicable by the processor;
one or more scrolling vocal effect indicators synchronized to a selected audio background track of a song, each of the one or more vocal effect indicators indicating when a corresponding one of the vocal effects is to be active within a timeline of the song; and
a timeline indicator element configured to indicate, relative to the one or more scrolling vocal effect indicators, the current temporal position within the song;
wherein the processor is configured to respond to an input to the GUI that toggles one of the toggle elements at a selected temporal position within the song by toggling activation of the corresponding vocal effect and the corresponding scrolling vocal effect indicator at the selected temporal position.

C1. The device of C0, wherein the processor is further configured to respond to selection of one of the vocal effect indicators via the GUI by presenting an option to modify a duration of the corresponding vocal effect.

C2. The device of C1, wherein modifying the duration of the corresponding vocal effect comprises at least partially deleting the corresponding vocal effect.

C3. The device of C0, the electronic device further comprising a non-transitory computer-readable memory in communication with the processor, the memory storing media files relating to a plurality of songs available for playback on the device, the media files comprising a plurality of vocal effects sequences related to a same one of the songs.

C4. The device of C0, wherein each of the toggle elements changes visual state when the corresponding vocal effect is active.

D0. A computer-implemented method for displaying and modifying digital signal processing effects, the method comprising:
playing a selected background music track of a song on an audio output of a device having a processor, a display, and an audio input;
presenting, on the display of the device, a graphical user interface (GUI) having a an array of toggle elements, each toggle element corresponding to one of a plurality of vocal effects, and one or more scrolling vocal effect indicators synchronized to the selected background music track, each of the one or more vocal effect indicators indicating when a corresponding one of the vocal effects is to be active within a timeline of the song;
receiving, via the audio input, a vocal input related to the song;
applying, by the processor, each of the vocal effects to the vocal input when indicated on the timeline;
scrolling the vocal effects indicators across the display relative to a timeline indicator element configured to indicate a current temporal position within the song;
changing, in response to activation of the corresponding vocal effect, a visual state of the respective toggle element; and
responding to an input to the GUI that toggles one of the toggle elements at a selected temporal position within the song by toggling activation of the corresponding vocal effect and the corresponding scrolling vocal effect indicator at the selected temporal position.

D1. The method of D0, further comprising:
receiving a selected vocal effects sequence comprising timeline information related to the plurality of vocal effects.

D2. The method of D1, further comprising:
automatically adjusting the selected vocal effects sequence based on one or more user-indicated parameters.

D3. The method of D2, wherein the one or more user-indicated parameters comprise a selected vocal range of the user.

D4. The method of D2, wherein the one or more user-indicated parameters comprise a selected vocal skill level of the user.

D5. The method of D0, wherein the scrolling vocal effects indicators each comprise a rectangular bar.

D6. The method of D0, further comprising:
presenting, on the display, a video corresponding to the song.

D7. The method of D0, further comprising:
recording the background music track, the vocal input, and the vocal effects as a single audio file.

D8. The method of D0, further comprising:
saving information relating to when the respective vocal effects are to be active within the timeline of the song as a vocal effects sequence file.

D9. The method of D0, further comprising:
recording the background music track, the vocal input, and the vocal effects in combination as a first digital file; and
saving information defining a vocal effects sequence modified by the user as at least a second digital file.

Advantages, Features, Benefits

The different embodiments and examples of the vocal effects control systems and methods described herein provide several advantages over known solutions. For example, illustrative embodiments and examples described herein include a straightforward and information-rich user interface that is clear and easily used by a novice user.

Additionally, and among other benefits, illustrative embodiments and examples described herein allow a user to test or add new vocal effects to a performance by simply tapping a button.

Additionally, and among other benefits, illustrative embodiments and examples described herein allow a user with no music engineering skills or background to add and modify vocal effects to a musical performance, and to gain an understanding of those vocal effects and effects sequences.

Additionally, and among other benefits, illustrative embodiments and examples described herein present a simple, yet highly accurate visual representation of vocal effects and combinations of effects.

Additionally, and among other benefits, illustrative embodiments and examples described herein may be applied to any type of effect, e.g., vocal and/or instrumental.

Additionally, and among other benefits, illustrative embodiments and examples described herein permit a user to share one or more aspects of the performance with other users, including sending a dry vocal track and/or vocal effects timeline for others to edit.

Additionally, and among other benefits, illustrative embodiments and examples described herein provide exact effects in real time, during the recording or practice process, such that the user can adjust his or her performance to maximize the features and nuances of the effects.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer-implemented method for real-time display and implementation of digital signal processing effects, the method comprising:
    previewing a background music track of a song on an audio output of a device having a processor, a display, and an audio input;
    presenting, on the display of the device, a graphical user interface (GUI) having a plurality of toggle elements, each toggle element corresponding to one of a plurality of vocal effects, and a timeline of the background music track;
    implementing one or more vocal effects by scrolling vocal effect indicators to selected temporal positions in the timeline of the background music track to thereby synchronize the starting and stopping of the one or more vocal effects with respect to the selected background music track, each of the one or more vocal effect indicators presenting a visual indication of when a corresponding one of the vocal effects is to be active and inactive within the timeline of the background music track; and
    playing back the background music track and simultaneously receiving, via the audio input, a live vocal input related to the background music track; and
    starting and stopping in real time, by the processor, each of the vocal effects to the vocal input in response to the vocal effect indicators on the timeline.

2. The method of claim 1, further comprising:
    receiving a selected vocal effects sequence comprising timeline information related to the plurality of vocal effects.

3. The method of claim 2, further comprising:
    automatically adjusting the selected vocal effects sequence based on one or more user-indicated parameters.

4. The method of claim 1, further comprising:
    scrolling the vocal effects indicators across the display relative to a timeline indicator that indicates a current temporal position within the background music track;
    changing, in response to activation of the corresponding vocal effect, a visual state of the respective toggle element; and
    responding to an input to the GUI that toggles one of the toggle elements at a selected temporal position within the background music track by toggling activation of the corresponding vocal effect and the corresponding scrolling vocal effect indicator at the selected temporal position.

5. The method of claim 4, further comprising:
    saving information defining a vocal effects sequence modified by the user as at least one digital file separate from the single audio file.

6. A computer-implemented method comprising:
    presenting a graphical user interface (GUI) on a display of an electronic device that includes a speaker output, a microphone input, and a processor configured to execute digital signal processing (DSP) instructions;
    simultaneously playing, via the speaker output, a background music track of a song, and presenting, via the GUI, a sequence of vocal effects that include time-based information related to the starting and stopping of each vocal effect in the sequence of vocal effects relative to a temporal time frame of the background music track;
    playing back the background music track and receiving vocal input via the microphone input while simultaneously starting and stopping each vocal effect in the sequence of vocal effects in response to the time-based information in the temporal time frame of the background music track; and
    automatically adjusting application of the vocal effects in response to inputs to the GUI;
    wherein the GUI includes:
        a plurality of toggle elements, each toggle element corresponding to a respective one of the plurality of vocal effects and capable of toggling a respective vocal effect to be active and to be inactive relative to the temporal time frame of the background music track;
        one or more vocal effect indicators synchronized to the selected background music track that scroll across the display in response to playback of the background music track, each of the one or more vocal effect indicators capable of indicating when a corresponding one of the vocal effects is active within the temporal time frame of the background music track; and
        a timeline indicator to indicate, relative to the one or more vocal effect indicators, the current temporal position within the temporal time frame of the background music track during the playback of the background music track and to indicate which vocal effect is active and which vocal effect is inactive.

7. The method of claim 6, wherein automatically adjusting application of the vocal effects in response to inputs to the GUI includes responding to an input to the GUI that toggles one of the toggle elements at a selected temporal position within the temporal time frame of the background music by toggling activation of the corresponding vocal effect and the corresponding vocal effect indicator at the temporal position.

8. The method of claim 6, further comprising:
saving adjustments made to the vocal effects as a modified vocal effects sequence.

9. The method of claim 8, further comprising:
communicating the modified vocal effects sequence to another electronic device.

10. A system comprising:
a display;
a microphone;
a speaker;
a non-transitory computer-readable memory storing media files relating to a plurality of songs available for playback on the system;
a processor in communication with the display, the microphone, the speaker, and the memory; and
a plurality of instructions executable by the processor to:
  present a user interface (UI) on the display;
  play, on the speaker, an audio background track of a selected one of the songs, while simultaneously presenting, via the UI, information related to one or more vocal effects and a temporal timeline of the selected one of the songs;
  enable forming, via the GUI, a sequence of vocal effects that include time-based information related to the starting and stopping of each vocal effect in the sequence of vocal effects relative to the temporal timeline of the audio background track of the song;
  play back the audio background track of the selected one of the songs and receive vocal input from the microphone while simultaneously starting and stopping each vocal effect in the sequence of vocal effects when encountered in the temporal timeline of the audio background track of the selected one of the songs.

11. The system of claim 10, wherein the plurality of instructions further adjust application of the vocal effects in response to inputs to the UI;
wherein the UI includes:
  a plurality of toggle elements, each toggle element corresponding to one of the plurality of vocal effects;
  one or more vocal effect indicators synchronized to the selected audio background track, each of the one or more vocal effect indicators indicating when a corresponding one of the vocal effects is active within the temporal timeline of the song; and
  a timeline indicator element that indicates, relative to the one or more vocal effect indicators, a current temporal position within the song;
wherein the processor is configured to respond to an input to the UI that toggles one of the toggle elements at a selected temporal position within the song by toggling a respective activation and deactivation of the corresponding vocal effect and the corresponding vocal effect indicator at the selected temporal position.

12. The system of claim 11, wherein the toggle elements comprise button elements that change visual state when toggled.

13. The system of claim 11, wherein the one or more vocal effect indicators are selectable and modifiable via the UI.

14. The system of claim 11, wherein the vocal effect indicators scroll horizontally with respect to the display in response to playback of the audio background track of the selected one of the songs, the timeline indicator element being stationary and substantially perpendicular with respect to the vocal effect indicators.

15. A device comprising:
an electronic device including a processor, an audio input, an audio output, and a display, the processor configured to present a graphical user interface (GUI) on the display;
wherein the GUI includes:
  a plurality of toggle elements, each toggle element corresponding to one of a plurality of vocal effects applicable by the processor;
  one or more vocal effect indicators on a timeline synchronized to a selected audio background track of a song, each of the one or more vocal effect indicators indicating when a corresponding one of the vocal effects is to be activated and deactivated within the timeline of the background track of the song; and
  a timeline indicator element configured to indicate, relative to the one or more vocal effect indicators, a current temporal position within the background track of the song;
wherein the processor is configured to receive a live audio performance via the audio input and to respond to an input to the GUI that toggles one of the toggle elements at a selected temporal position within the background track of the song by toggling activation and deactivation of the corresponding vocal effect and the corresponding vocal effect indicator at the selected temporal position on the timeline on the display.

16. The device of claim 15, wherein the processor is further configured to respond to selection of one of the vocal effect indicators via the GUI by presenting an option to modify a duration of the corresponding vocal effect.

17. The device of claim 16, wherein modifying the duration of the corresponding vocal effect comprises at least partially deleting the corresponding vocal effect.

18. The device of claim 15, the electronic device further comprising a non-transitory computer-readable memory in communication with the processor, the memory storing media files relating to a plurality of songs available for playback on the device, the media files comprising a plurality of vocal effects sequences related to a same one of the songs.

* * * * *